(12) United States Patent
Chavana, Jr. et al.

(10) Patent No.: US 10,709,307 B2
(45) Date of Patent: Jul. 14, 2020

(54) SURFACE CLEANING APPARATUS

(71) Applicant: Rug Doctor, LLC, Plano, TX (US)

(72) Inventors: Ernest Matthew Chavana, Jr., Villa Ridge, MO (US); Richard Foster, Powell, OH (US); Stanley Anderson, Fenton, MO (US); Christopher Terpstra, Frisco, TX (US); Jan Valentic, Plano, TX (US); Xintao Ma, Suzhou (CN)

(73) Assignee: RUG DOCTOR, LLC, Plano, TX (US)

( * ) Notice: Subject to any disclaimer, the term of this patent is extended or adjusted under 35 U.S.C. 154(b) by 78 days.

(21) Appl. No.: 15/708,999

(22) Filed: Sep. 19, 2017

(65) Prior Publication Data

US 2019/0082920 A1    Mar. 21, 2019

(51) Int. Cl.
*A47L 11/30* (2006.01)
*A47L 11/40* (2006.01)
(Continued)

(52) U.S. Cl.
CPC .......... *A47L 11/302* (2013.01); *A47L 7/0004* (2013.01); *A47L 9/246* (2013.01); *A47L 9/327* (2013.01);
(Continued)

(58) Field of Classification Search
CPC ...... A47L 11/302; A47L 7/0004; A47L 9/246; A47L 9/327; A47L 11/201; A47L 11/34;
(Continued)

(56) References Cited

U.S. PATENT DOCUMENTS 4,018,493 A * 4/1977 Lyman .................... A47L 9/246
15/377
4,963,100 A * 10/1990 Genoa ..................... A47L 9/246
439/191
(Continued)

FOREIGN PATENT DOCUMENTS

EP        1818001 A2    8/2007
JP     2004-113540 A    4/2004
(Continued)

OTHER PUBLICATIONS

European Search Report dated Apr. 26, 2019, in connection with counterpart European Patent Application No. 18195027.0, citing the above references.
(Continued)

*Primary Examiner* — Dung Van Nguyen
(74) *Attorney, Agent, or Firm* — Hauptman Ham, LLP

(57) ABSTRACT

An apparatus includes a handle having a handle fluid input, a handle fluid output, a first handle electrical contact, a second handle electrical contact, a first handle air passage, and a second handle air passage. The apparatus also includes a shaft having a shaft fluid input, a shaft fluid output, a first shaft electrical contact, a second shaft electrical contact, a first shaft air passage, a second shaft air passage, and a first shaft coupling including the shaft fluid input, the first shaft electrical contact and the first shaft air passage. The first shaft coupling is configured to mate with the handle to connect the shaft fluid input with the handle fluid output, connect the first shaft electrical contact with the second handle electrical contact with the second handle electrical contact, and connect the first shaft air passage with the second handle air passage.

18 Claims, 8 Drawing Sheets

(51) Int. Cl.
    *A47L 11/34* (2006.01)
    *A47L 11/20* (2006.01)
    *A47L 9/24* (2006.01)
    *A47L 9/32* (2006.01)
    *A47L 7/00* (2006.01)

(52) U.S. Cl.
    CPC .............. *A47L 11/201* (2013.01); *A47L 11/34* (2013.01); *A47L 11/4005* (2013.01); *A47L 11/4008* (2013.01); *A47L 11/4041* (2013.01); *A47L 11/4044* (2013.01); *A47L 11/4075* (2013.01); *A47L 11/4088* (2013.01)

(58) Field of Classification Search
    CPC .............. A47L 11/4005; A47L 11/4008; A47L 11/4041; A47L 11/4044; A47L 11/4075; A47L 11/4088
    See application file for complete search history.

(56) References Cited

U.S. PATENT DOCUMENTS

| | | | | |
|---|---|---|---|---|
| 4,993,104 A | * | 2/1991 | Kasper | A47L 7/0004 15/319 |
| 5,189,755 A | | 3/1993 | Yonkers et al. | |
| 5,455,984 A | * | 10/1995 | Blase | A47L 7/0009 15/339 |
| 5,459,901 A | | 10/1995 | Blase et al. | |
| 5,555,597 A | * | 9/1996 | Berfield | A47L 11/34 15/321 |
| 5,938,460 A | | 8/1999 | Collins et al. | |
| 2006/0174441 A1 | * | 8/2006 | Genoa | A47L 9/327 15/410 |
| 2015/0135473 A1 | * | 5/2015 | Simon | A47L 11/34 15/320 |

FOREIGN PATENT DOCUMENTS

| | | |
|---|---|---|
| JP | 2007-267779 A | 10/2007 |
| KR | 1998-0006611 U | 4/1998 |

OTHER PUBLICATIONS

Korean Office Action dated Jul. 22, 2019, in connection with counterpart Korean Patent Application No. 10-2018-0111559, citing the above references.

Indian First Examination Report dated Nov. 14, 2019 in connection with the Indian Patent Application No. 201844033411, citing the above reference(s).

Japanese Office Action dated Dec. 3, 2019 in connection with the Japanese Patent Application No. 2018-154620, citing the above reference(s).

Korean Office Action for corresponding Korean application No. 10-2018-0111559 dated Jan. 22, 2020.

Korean Notice of Allowance dated Mar. 19, 2020, in connection with the Korean Patent Application No. 10-2018-0111559.

\* cited by examiner

SURFACE CLEANING APPARATUS

BACKGROUND

Device manufacturers and service providers are continually challenged to develop cleaning systems capable of providing value and convenience to consumers. Conventional floor cleaning systems are often intimidating to consumers and offer limited flexibility in application, use and/or transport.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
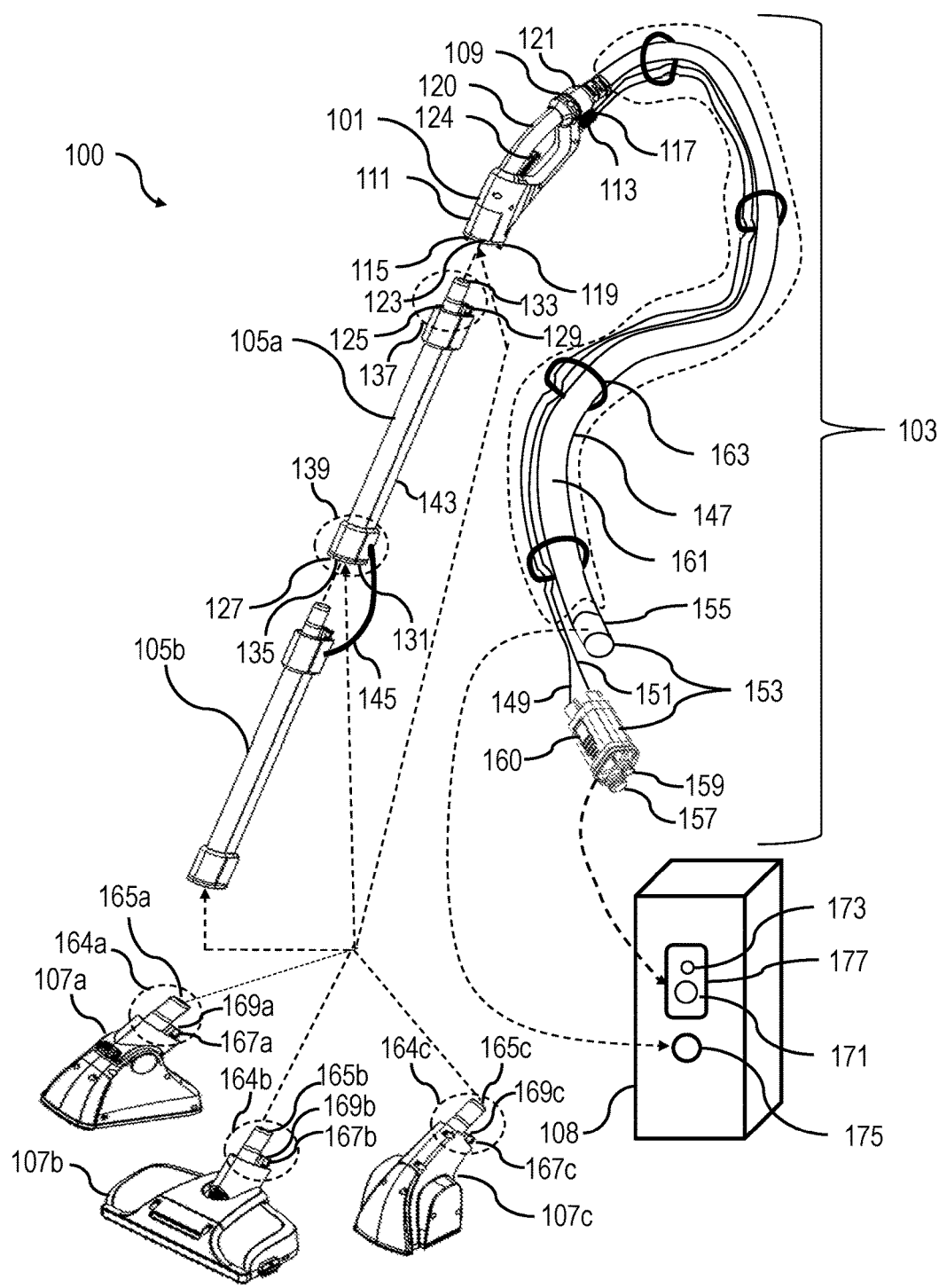
FIG. 1 is a perspective view of an apparatus, in accordance with one or more embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the location of a first feature over or on a second feature in the description that follows may include embodiments in which the first and second features are in direct contact, and may also include embodiments in which additional features may be between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Conventional liquid extraction devices are often large, bulky, and otherwise intimidating cleaning systems that consumers usually have difficulty operating and handling. Conventional cleaning systems are often limited as to how the components of the cleaning system can be manipulated by a consumer, making transport and service difficult.

FIG. 1 is a perspective view of an apparatus 100, in accordance with one or more embodiments. Apparatus 100 comprises a handle 101 and a connectivity bundle 103. In some embodiments, apparatus 100 optionally comprises one or more of an upper shaft 105a, a lower shaft 105b, or one or more accessory attachments 107a, 107b or 107c (collectively referred to as "accessory attachment 107").

Apparatus 100 is a modular system in which two or more of handle 101, connectivity bundle 103, upper shaft 105a, lower shaft 105b and at least one accessory attachment 107 are configured to be communicatively coupled in at least one combination. In some embodiments, apparatus 100 is a modular system in which two or more of handle 101, connectivity bundle 103, upper shaft 105a, lower shaft 105b and at least one accessory attachment 107 are configured to be communicatively coupled in a plurality of different combinations.

The modular capabilities of apparatus 100 increase a user's confidence in the user's ability to operate, handle and/or transport an extraction system 108 with which the apparatus 100 is associated. The modular capabilities of apparatus 100 also make transport and service easier and more convenient for a user.

In some embodiments, the handle 101 is removably coupled with one or more of upper shaft 105a, lower shaft 105b, or accessory attachment 107. In some embodiments, one or more of upper shaft 105a or lower shaft 105b is removably coupled with an accessory attachment 107. In some embodiments, one or more of upper shaft 105a or lower shaft 105b is configured to be removably coupled with one or more of the other of upper shaft 105a or lower shaft 105b, handle 101 or an accessory attachment 107. In some embodiments, the connectivity bundle 103 is removably coupled with the handle 101. In some embodiments, connectivity bundle 103 is fixed to handle 101.

Handle 101 comprises a first end 109 and a second end 111 opposite the first end 109. A handle fluid input 113 is on the first end 109 of the handle 101, and a handle fluid output 115 is on the second end 111 of the handle 101. The handle fluid output 115 is communicatively coupled with the handle fluid input 113 by way of a tube, hose, channel, or other suitable structure. The tube, hose, channel, or other suitable structure is internal to the handle 101. In some embodiments, the tube, hose, channel, or other suitable structure is external to the handle 101.

A first handle electrical contact 117 is on the first end 109 of the handle 101, and a second handle electrical contact 119 is on the second end 111 of the handle 101. The second handle electrical contact 119 is communicatively coupled with the first handle electrical contact 117 by way of a conductive material between the first handle electrical contact 117 and the second handle electrical contact 119. The conductive material is internal to the handle 101. In some embodiments, the conductive material is external to the handle 101. In some embodiments, the conductive material comprises one or more wires.

A grip portion 120 is between the first end 109 and the second end 111 of the handle 101. A first handle air passage 121 is on the first end 109 of the handle 101, and a second handle air passage 123 is on the second end 111 of the handle 101. First handle air passage 121 is communicatively coupled with second handle air passage 123. In some embodiments, first handle air passage 121 is communicatively coupled with second handle air passage 123 by way of a tube, a shaft, a hose, a channel, or some other suitable structure internal to the handle 101. In some embodiments, tube, shaft, hose, channel, or other suitable structure is inside the grip portion 120. In some embodiments, the tube or channel is defined, at least in part, by one or more inner sidewalls of the grip portion 120. In some embodiments, first handle air passage 121 is communicatively coupled with second handle air passage 123 by way of a tube, a shaft, a hose, a channel, or some other suitable structure external to the handle 101.

A trigger 124 is between the first end 109 and the second end 111 of the handle 101. The trigger 124 is configured to cause fluid to flow from the handle fluid input 113 to the handle fluid output 115. In some embodiments, the trigger 124 comprises a valve configured to be in an open position if the trigger 124 is actuated and in a closed position if the trigger 124 is released. In some embodiments, trigger 124 is communicatively coupled with a valve configured to be in an open position if the trigger 124 is actuated and in a closed position if the trigger 124 is released.

Upper shaft 105a and lower shaft 105b are configured to be coupled with one another and/or individually coupled with handle 101. In some embodiments, upper shaft 105a and lower shaft 105b are identical and interchangeable. In some embodiments, upper shaft 105a and lower shaft 105b are identical and arranged such that if the upper shaft 105a and the lower shaft 105b are coupled with one another, upper shaft 105a is the shaft that is capable of being coupled with handle 101 and lower shaft 105b is capable of being coupled with an accessory attachment 107. In some embodiments, lower shaft 105b is considered to be included in apparatus 100 as an accessory attachment.

Each of upper shaft 105a and lower shaft 105b comprises a first end configured to be coupled with the handle 101 or the other of upper shaft 105a or lower shaft 105b, and a second end configured to be coupled with an accessory attachment 107 or the other of upper shaft 105a or lower shaft 105b. To avoid obscuring the drawings, the features of upper shaft 105a are discussed, but it should be understood that in some embodiments, lower shaft 105b comprises identical features. Upper shaft 105a includes a shaft fluid input 125 and a shaft fluid output 127. Shaft fluid output 127 is communicatively coupled with shaft fluid input 125. In some embodiments, shaft fluid output 127 is communicatively coupled with shaft fluid input 125 by way of a tube, a shaft, a hose, a channel, or some other suitable structure internal to the upper shaft 105a. In some embodiments, shaft fluid output 127 is communicatively coupled with shaft fluid input 125 by way of a tube, a shaft, a hose, a channel, or some other suitable structure external to the upper shaft 105a.

A first shaft electrical contact 129 is on the first end of upper shaft 105a, and a second shaft electrical contact 131 is on the second end of upper shaft 105a. The second shaft electrical contact 131 is communicatively coupled with the first shaft electrical contact 129. The second shaft electrical contact 131 is communicatively coupled with the first shaft electrical contact 129 by way of a conductive material between the first shaft electrical contact 129 and the second shaft electrical contact 131. The conductive material is internal to the upper shaft 105a. In some embodiments, the conductive material is external to the upper shaft 105a. In some embodiments, the conductive material comprises one or more wires.

A first shaft air passage 133 is on the first end of upper shaft 105a and a second shaft air passage 135 in on the second end of upper shaft 105a. Second shaft air passage 135 is communicatively coupled with the first shaft air passage 133. In some embodiments, second shaft air passage 135 is communicatively coupled with first shaft air passage 133 by way of a tube, a shaft, a hose, a channel, or some other suitable structure internal to the upper shaft 105a. In some embodiments, second shaft air passage 135 is communicatively coupled with first shaft air passage 133 by way of a tube, a shaft, a hose, a channel, or some other suitable structure external to the upper shaft 105a.

A first shaft coupling 137 comprising the shaft fluid input 125, the first shaft electrical contact 129 and the first shaft air passage 133 is configured to mate with the second end 111 of the handle 101 to connect the shaft fluid input 125 with the handle fluid output 115, connect the first shaft electrical contact 129 with the second handle electrical contact 119, and connect the first shaft air passage 133 with the second handle air passage 123.

In some embodiments, the first shaft coupling 137 is configured to be press-fit into the second end 111 of handle 101 such that the shaft fluid input 125, the first shaft electrical contact 129 and the first shaft air passage 133 are inserted into corresponding receptacles included in the second end 111 of the handle 101. In some embodiments, the first shaft coupling 137 is configured to receive the second end 111 of handle 101 such that the shaft fluid input 125, the first shaft electrical contact 129 and the first shaft air passage 133 are receptacles configured to mate with the handle fluid output 115, the second handle electrical contact 119 and the second handle air passage 123. In some embodiments, the first shaft coupling 137 is removably coupled with the second end 111 of handle 101 by a latch, movable collar or other suitable locking mechanism.

A second shaft coupling 139 comprising the shaft fluid output 127, the second shaft electrical contact 131 and the second shaft air passage 135 is configured to mate with a corresponding accessory coupling of accessory attachment 107 to facilitate transfer of fluid from the handle 101 to the attached accessory attachment 107, supply electricity to the attached accessory attachment 107, and link an accessory air passage of an attached accessory attachment 107 with the first handle air passage 121.

In some embodiments, one or more of upper shaft 105a or lower shaft 105b comprises a housing 143. One or more of the first shaft air passage 133 is coupled with the second shaft air passage 135, the shaft fluid input 125 is coupled with the shaft fluid output 127, or the first shaft electrical contact 129 is coupled with the second shaft electrical contact 131 within the housing 143. In some embodiments, first shaft air passage 133 is coupled with the second shaft air passage 135 by way of one or more of a pipe, a hose, or some other suitable structure external to the housing 143.

In some embodiments, the first shaft coupling 137 of lower shaft 105b is configured to be press-fit into the second shaft coupling 139 of upper shaft 105a such that the shaft fluid input 125 of the lower shaft 105b, the first shaft electrical contact 129 of lower shaft 105b and the first shaft air passage 133 of lower shaft 105b are inserted into corresponding receptacles included in the second shaft coupling 139 of upper shaft 105a. In some embodiments, the first shaft coupling 137 of lower shaft 105b is configured to receive the second shaft coupling 139 of upper shaft 105a such that the shaft fluid input 125 of lower shaft 105b, the first shaft electrical contact 129 of lower shaft 105b and the first shaft air passage 133 of lower shaft 105b are receptacles configured to mate with the shaft fluid output 127 of upper shaft 105*a*, the second shaft electrical contact 131 of upper shaft 105*a* and the second shaft air passage 135 of upper shaft 105*a*. In some embodiments, the second shaft coupling 139 is removably coupled with the first shaft coupling 137 of lower shaft 105*b* by a latch, movable collar or other suitable locking mechanism.

In some embodiments, upper shaft 105*a* and lower shaft 105*b* are a pair of shafts 105. In some embodiments, upper shaft 105*a* and lower shaft 105*b* are tethered to one another by way of a link 145. Link 145 comprises a cord, a chain, a rope, a string, a bungee cord, or some other suitable constraint configured to allow the upper shaft 105*a* and the lower shaft 105*b* to be removably coupled with one another.

Connectivity bundle 103 comprises a hose 147 communicatively coupled with the first handle air passage 121, a fluid supply line 149 communicatively coupled with the handle fluid input 113, a power supply line 151 communicatively coupled with the first handle electrical contact 117, and an extraction system coupler 153 comprising a suction port coupling 155 communicatively coupled with the hose 147, a fluid supply coupling 157 communicatively coupled with the fluid supply line 149, and a power supply coupling 159 communicatively coupled with the power supply line 151.

The extraction system coupler 153 is configured to facilitate suction of one or more of air or fluid through the hose 147 and into an extraction system 108 with which the extraction system coupler 153 is connected, and to facilitate a transfer of electricity from the connected extraction system 108 to the power supply line 151. In some embodiments, the fluid supply coupling 157 and the power supply coupling 159 are included in a plug body 160 that is separated from the suction port coupling 155.

The fluid supply line 149 and the power supply line 151 are fastened to an exterior surface 161 of the hose 147 by a plurality of clasps 163. Each clasp 163 is configured to wrap around the hose 147, the fluid supply line 149 and the power supply line 151. In some embodiments, one or more clasps 163 are configured to accommodate the fluid supply line 149 and the power supply line 151 in a corresponding line seat such that each of the fluid supply line 149 and the power supply line 151 is between each corresponding line seat and the exterior surface 161 of the hose 147. In some embodiments, in lieu of, or in addition to, the clasps 163, the fluid supply line 149, the power supply line 151 and the hose 147 are surrounded by an optional sleeve 164 configured to cover the fluid supply line 149, the power supply line 151 and the hose 147 to prevent the fluid supply line 149, the power supply line 151 and the hose 147 from entanglement with an external element or snagging. In some embodiments, the fluid supply line 149, the power supply line 151 and the hose 147 are constrained within sleeve 164.

The accessory attachments 107 comprise a corresponding accessory coupling 164*a*-164*c* (collectively referred to as "accessory coupling 164") comprising an accessory air passage 165*a*-165*c* (collectively referred to as "accessory air passage 165"), an accessory fluid coupling 167*a*-167*c* (collectively referred to as "accessory fluid coupling 167"), and an accessory electrical coupling 169*a*-169*c* (collectively referred to as "accessory electrical coupling 169") configured to mate with one or more of the second shaft coupling 139 of upper shaft 105*a*, the second shaft coupling 139 of lower shaft 105*b*, or the second end 111 of the handle 101. The accessory coupling 164 is configured to facilitate transfer of fluid from the handle 101 to an attached accessory attachment 107, supply electricity to the attached accessory attachment 107, and link the accessory air passage 165 of the attached accessory attachment 107 with the first handle air passage 121 directly or indirectly by way of at least one of the upper shaft 105*a* or the lower shaft 105*b*. In some embodiments, the accessory coupling 164 comprises at least one gasket configured to form a seal between accessory air passage 165 or the accessory fluid coupling 167 with the corresponding air passage or fluid coupling of the second shaft coupling 139 of upper shaft 105*a*, the second shaft coupling 139 of lower shaft 105*b*, or the second end 111 of the handle 101 with which the accessory attachment 107 is attached. In some embodiments, accessory attachments 107 are configured to be press-fit into the second shaft coupling 139 of upper shaft 105*a*, the second shaft coupling 139 of lower shaft 105*b*, or the second end 111 of the handle 101 with which the accessory attachment 107 is attached.

Extraction system 108 is a liquid cleaning extraction system for cleaning hard surfaces, carpeting, tile, grout, glass, or any other suitable surface. Extraction system 108 includes a fluid supply port 171, a power supply port 173, and a suction port 175. The fluid supply port 171 and the power supply port 173 are configured to supply fluid and electricity to the apparatus 100 by way of the extraction system coupler 153. The fluid supply port 171 and the power supply port 173 are included in a receptacle 177 configured to mate with the plug body 160 to communicatively couple the fluid supply port 171 and the power supply port 173 with the fluid supply coupling 157 and the power supply coupling 159, respectively.

In use, the extraction system 108 supplies fluid to the handle 101. If the trigger 124 is actuated, fluid supplied by the extraction system 108 is caused to be output by one or more of the handle fluid output 115, the shaft fluid output 127 of the upper shaft 105*a*, the shaft fluid output 127 of the lower shaft 105*b*, or the accessory attachment 107. For example, if the accessory attachment 107 is a cleaning head, the cleaning head is configured to release fluid onto a surface that is to be cleaned by the cleaning head based on an actuation of the trigger 124.

Accessory attachment 107*a* is a grout cleaning head configured to expel fluid supplied by the extraction system 108 onto a surface opposite to a bottom of the accessory attachment 107*a*. Accessory attachment 107*a* is configured to agitate the surface opposite the bottom of the accessory attachment 107*a* by way of an agitator and to draw one of more of air, fluid or debris from the surface opposite the bottom of the accessory attachment 107*a* into a nozzle of the accessory attachment 107*a* based on a suction force provided by the extraction system 108. The suction force provided by the extraction system 108 causes the one or more of air, fluid or debris to be drawn through the nozzle of accessory attachment 107*a* into at least one of the shaft air passages or the handle air passages and the hose based on the combination of the upper shaft 105*a*, lower shaft 105*b* and handle 101 with which the accessory attachment 107*a* is attached.

Accessory attachment 107*b* is a hard surface cleaning head configured to expel fluid supplied by the extraction system 108 onto a surface opposite to a bottom of the accessory attachment 107*b*. Accessory attachment 107*b* is configured to agitate the surface opposite the bottom of the accessory attachment 107*b* by way of an agitator and to draw one of more of air, fluid or debris from the surface opposite the bottom of the accessory attachment 107*b* into a nozzle of the accessory attachment 107*b* based on a suction force provided by the extraction system 108. The suction force provided by the extraction system 108 causes the one or more of air, fluid or debris to be drawn through the nozzle of accessory attachment 107b into at least one of the shaft air passages or the handle air passages and the hose based on the combination of the upper shaft 105a, lower shaft 105b and handle 101 with which the accessory attachment 107b is attached.

Accessory attachment 107c is an upholstery cleaning head configured to expel fluid supplied by the extraction system 108 onto a surface opposite to a bottom of the accessory attachment 107c. Accessory attachment 107c is configured to agitate the surface opposite the bottom of the accessory attachment 107c by way of an agitator and to draw one of more of air, fluid or debris from the surface opposite the bottom of the accessory attachment 107c into a nozzle of the accessory attachment 107c based on a suction force provided by the extraction system 108. The suction force provided by the extraction system 108 causes the one or more of air, fluid or debris to be drawn through the nozzle of accessory attachment 107c into at least one of the shaft air passages or the handle air passages and the hose based on the combination of the upper shaft 105a, lower shaft 105b and handle 101 with which the accessory attachment 107c is attached.

In some embodiments, one or more panels that are included in or at least partially define one or more sides of handle 101, upper shaft 105a, lower shaft 105b, accessory attachment 107a, accessory attachment 107b, or accessory attachment 107c, are capable of being removed for ease of access to the features housed therein. In some embodiments, one or more panels that are included in or at least partially define one or more sides of handle 101, upper shaft 105a, lower shaft 105b, accessory attachment 107a, accessory attachment 107b, or accessory attachment 107c, are quick-release panels to facilitate easy access for a user to service one or more components of the apparatus 100.

In some embodiments, at least one of the one or more quick-release panels is coupled with another portion of a corresponding handle 101, upper shaft 105a, lower shaft 105b, accessory attachment 107a, accessory attachment 107b, or accessory attachment 107c by one or more fasteners. In some embodiments, the one or more fasteners are capable of being tightened and loosened using a conventional screwdriver, a flathead screwdriver, a Philips head screwdriver, a hex-head screw driver, a torx-head screw driver, or other suitable type of screwdriver head. In some embodiments, all of the quick-release panels that are coupled with another portion of a corresponding handle 101, upper shaft 105a, lower shaft 105b, accessory attachment 107a, accessory attachment 107b, or accessory attachment 107c by a fastener are coupled by a same type of fastener to facilitate ease of access to the corresponding component of apparatus 100 and the components housed therein. In some embodiments, one or more connection points by which any of the one or more panels that are included in or at least partially define one or more sides of handle 101, upper shaft 105a, lower shaft 105b, accessory attachment 107a, accessory attachment 107b, or accessory attachment 107c are lined with threaded inserts configured to facilitate repeated access to the corresponding component of apparatus 100 without stripping the threaded insert.

In some embodiments, one or more of the couplings between handle 101, upper shaft 105a, lower shaft 105b or accessory attachments 107 comprise one or more gaskets configured to create a seal, for example, between connected fluid couplings and/or air passages. In some embodiments, the couplings between handle 101, upper shaft 105a, lower shaft 105b or accessory attachments 107 are capable of being disassembled by pulling at least one of the handle 101, upper shaft 105a, lower shaft 105b or an accessory attachment 107 away from a connected component to separate the press-fit attachment.

Figure 2:
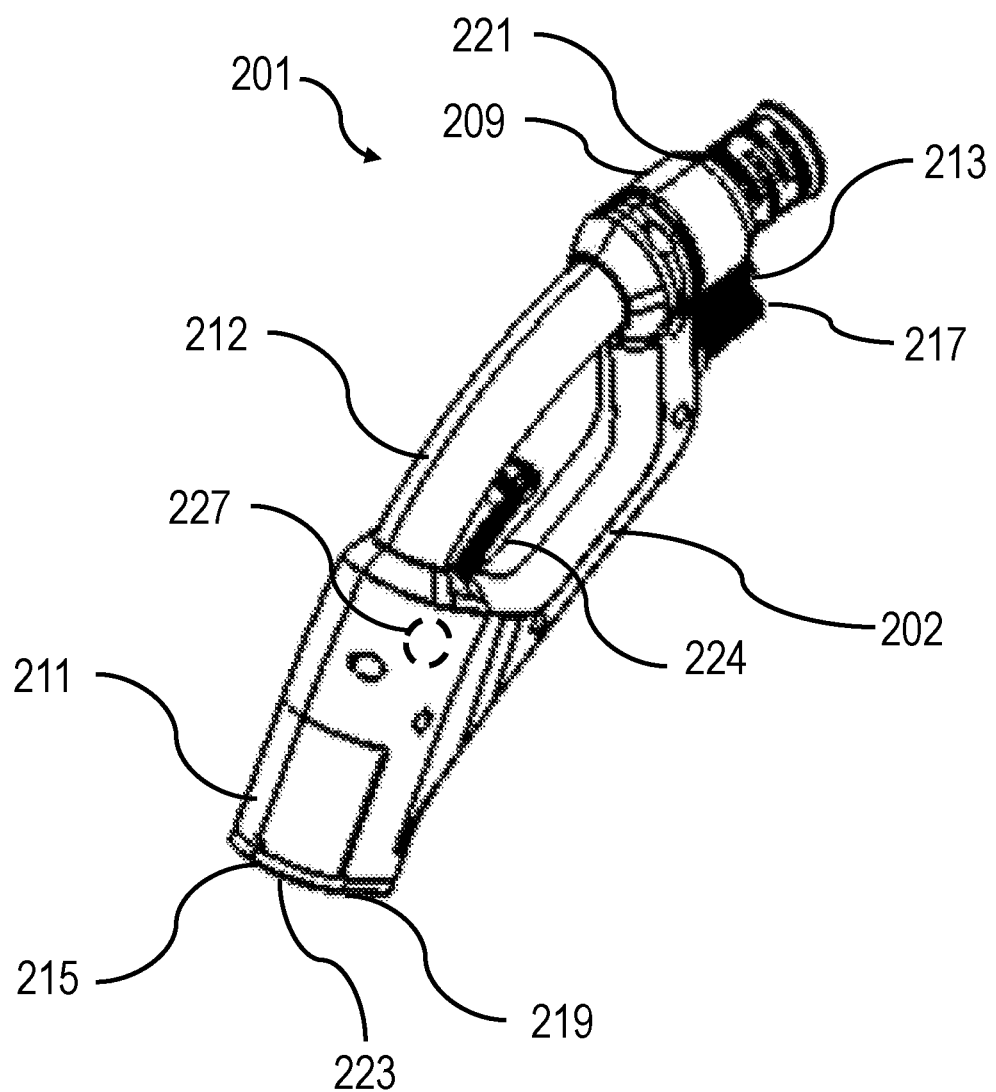
FIG. 2 is a perspective view of a handle, in accordance with one or more embodiments.

FIG. 2 is a perspective view of a handle 201, in accordance with one or more embodiments. Handle 201 includes features similar to those discussed with respect to handle 101 (FIG. 1), with the reference numerals increased by 100. Handle 201 includes a grip guard 202 between the first end 209 of handle 201 and the second end 211 of handle 201. The grip guard 202 is separated from the grip portion 212. The handle fluid input 213 is communicatively coupled with the handle fluid output 215 by way of the grip guard 202. In some embodiments, the handle fluid output 215 is communicatively coupled with the handle fluid input 213 by way of the grip guard 202. In some embodiments, a tube, hose, channel, or other suitable structure that communicatively couples the handle fluid output 215 with the handle fluid input 213 is within the grip guard 202. In some embodiments, a channel through which fluid flows is defined, at least in part, by one or more inner sidewalls of the grip guard 202. Trigger 224 is between the grip portion 212 and grip guard 202. In some embodiments, trigger 224 is configured to cause an agitator motor of an accessory attachment 107 (FIG. 1) to move an agitator of the accessory attachment 101 by causing one or more of power or a signal to be communicated to the agitator motor from the extraction system 108. In some embodiments, handle 201 includes a separate agitator switch 227 that is configured to cause the agitator motor of an accessory attachment 107 (FIG. 1) to move an agitator of the accessory attachment 101 by causing one or more of power or a signal to be communicated to the agitator motor from the extraction system 108.

Grip portion 212 has an outer diameter and an inner diameter. An inner sidewall of the grip portion 212 defines a least a portion of a channel that communicatively couples the first handle air passage 221 with the second handle air passage 223. In some embodiments, the inner diameter of the grip portion 212 is equal to the inner diameter of the hose 147 (FIG. 1). Having a grip portion 212 with an inner diameter that is equal to the inner diameter of hose 147 makes it possible to facilitate flow of air and/or fluid from the first handle air passage 221 to the second handle air passage 223 and into hose 147 without a hose, tube, shaft or pipe, for example, inside the grip portion 212. By excluding a hose, tube, shaft or pipe from the inside of the grip portion 212, the outer diameter of the grip portion 212 is capable of being minimized. A grip portion 212 that has a minimized outer diameter is capable of being handled by a user that has small hands, for example, in a more comfortable and effective manner than a grip portion that is larger than otherwise necessary to operate the apparatus 100 (FIG. 1) comfortably and effectively. In some embodiments, the outer diameter of the grip portion 212 is equal to the outer diameter of hose 147.

Figure 3:
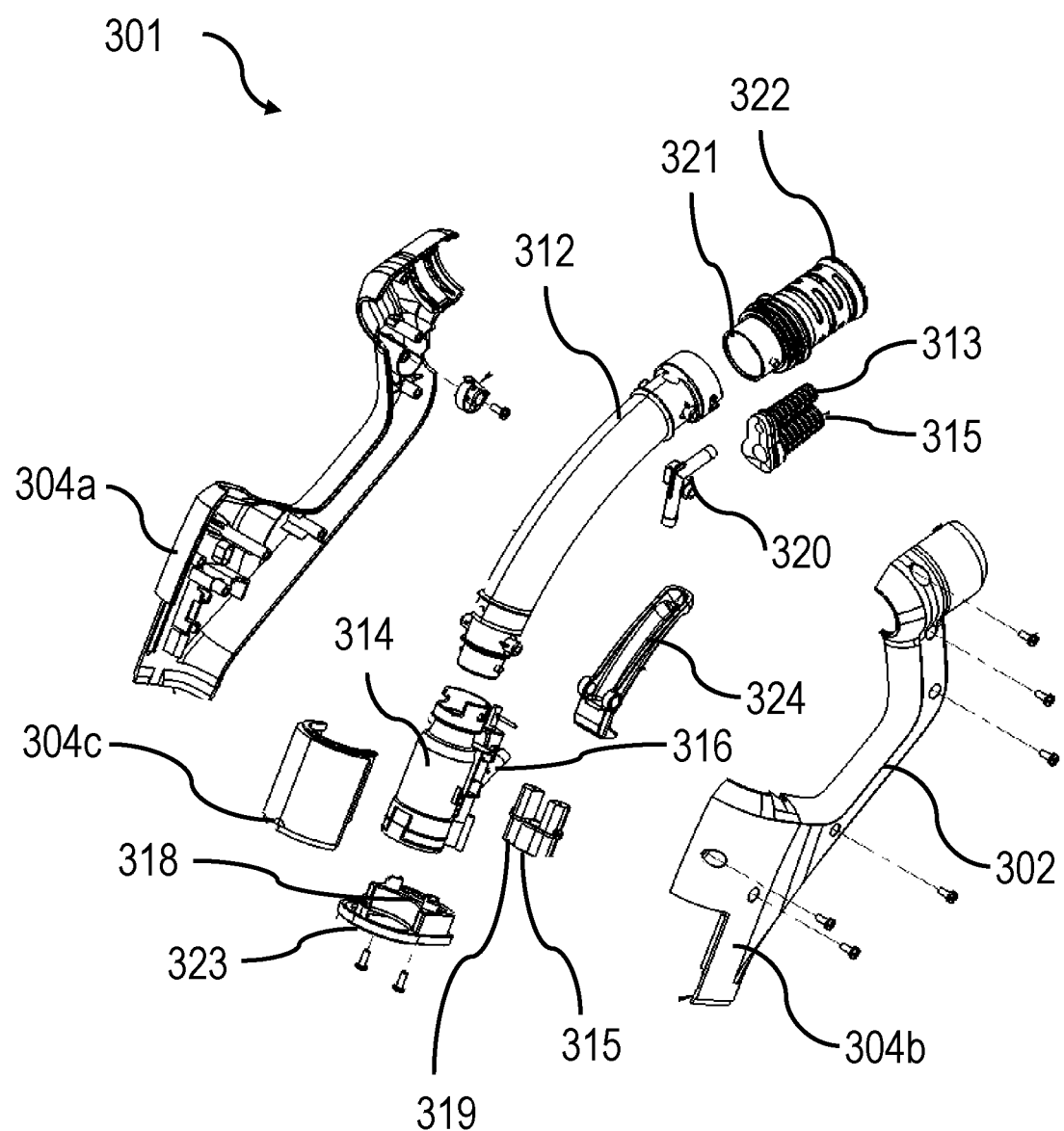
FIG. 3 is an exploded view of a handle, in accordance with one or more embodiments.

FIG. 3 is an exploded view of a handle 301, in accordance with one or more embodiments. Handle 301 includes features similar to those discussed with respect to handle 201 (FIG. 2), with the reference numerals increased by 100. A first handle body portion 304a, a second handle body portion 304b and a third handle body portion 304c together form a handle housing. The first handle body portion 304a and the second handle body portion 304b each include a respective portion of the grip guard 302. Grip portion 312 is a curved tube that is at least partially exposed from the handle housing. In some embodiments, grip portion 312 comprises a rigid material. In some embodiments, grip portion 312 comprises a flexible material.

A valve unit comprises an air passage extension 314 and a valve 316. Air passage extension 314 is configured to communicatively couple the channel defined by the inner sidewalls of grip portion 312 with the second handle air passage 323 to facilitate the communicative coupling of first handle air passage 321 with second handle air passage 331.

Valve 316 is configured to be coupled with trigger 324. In some embodiments, valve 316 is coupled with trigger 324 by a mechanical linkage. In some embodiments, valve 316 is operatively coupled with trigger 324, and the actuation of trigger 324 causes an electrical signal to be communicated to valve 316, causing valve 316 to be in the open or closed position.

A handle end-cap 318 includes one or more sidewalls that define the second handle air passage 323. Handle end-cap 318 is configured to be attached to one or more of the first handle body portion 304a, the second handle body portion 304b, or the third handle body portion 304c. The handle end-cap 318 has an opening defined by one or more sidewalls through which the handle fluid output 315 and the second handle electrical contact 319 are accessible. A fluid coupler 320 is configured to be communicatively coupled with the handle fluid input 313 to facilitate flow of fluid from the handle fluid input 313 toward the grip guard 302 such that fluid flow into the grip guard 302 or a hose, tube, channel or other suitable structure that is housed within the grip guard 302 that communicatively couples the handle fluid input 313 with the handle fluid output 315.

A hose connector 322 is attached to the second end of handle 301. Hose connector 322 is attached to the first end of handle 301 and is configured to wrap around a hose such as hose 147 (FIG. 1) which is communicatively coupled with first handle air passage 321. Hose connector 322 is configured to support an end of the hose coupled with handle 301 to minimize stress on the hose 147 or the coupling between the first handle air passage 221 and the attached hose 147 caused by movement of the handle 301 or attached hose 147 with respect to the other of the handle 301 or the attached hose 147.

Figure 4:
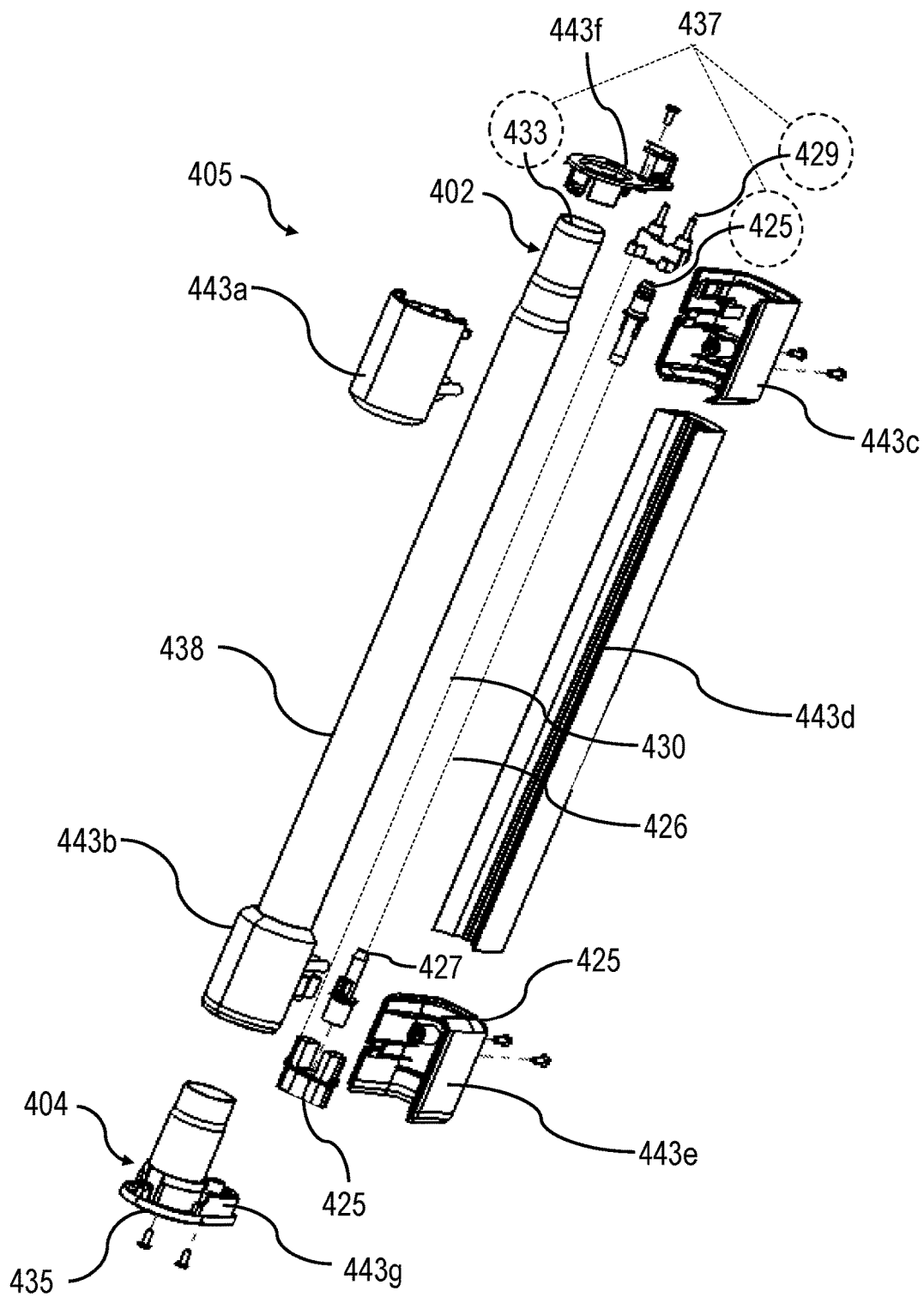
FIG. 4 is an exploded view of a shaft, in accordance with one or more embodiments.

FIG. 4 is an exploded view of a shaft 405, in accordance with one or more embodiments. Shaft 405 is similar to upper shaft 105a (FIG. 1) and lower shaft 105b (FIG. 1), with the reference numerals increased by 300. Shaft 405 is capable of being used as one or more of upper shaft 105a or lower shaft 105b. In some embodiments, apparatus 100 (FIG. 1) comprises a plurality of shafts 405.

Shaft 405 comprises a first end 402 configured to be coupled with handle 101 (FIG. 1) or another shaft 405, and a second end 404 configured to be coupled with an accessory attachment 107 (FIG. 1) or another shaft 405.

Shaft 405 includes a shaft fluid input 425 and a shaft fluid output 427. Shaft fluid output 427 is communicatively coupled with shaft fluid input 425. In some embodiments, shaft fluid output 427 is communicatively coupled with shaft fluid input 425 by way of a tube, a shaft, a hose, a channel, or some other suitable structure 426.

A first shaft electrical contact 429 is on the first end 402 of shaft 405, and a second shaft electrical contact 431 is on the second end 404 of shaft 405. The second shaft electrical contact 431 is communicatively coupled with the first shaft electrical contact 429. The second shaft electrical contact 431 is communicatively coupled with the first shaft electrical contact 429 by way of a conductive material 430 between the first shaft electrical contact 429 and the second shaft electrical contact 431.

A first shaft air passage 433 is on the first end 402 of shaft 405 and a second shaft air passage 435 in on the second end 404 of shaft 405. Second shaft air passage 435 is communicatively coupled with the first shaft air passage 433. Second shaft air passage 435 is communicatively coupled with first shaft air passage 433 by way of a tube 438. Tube 438 comprises a metal material. In some embodiments, tube 438 comprises one or more of a metal, a polymer, or some other suitable material. In some embodiments, the first end 402 or the second end 404 of tube 438 comprises at least one tapered portion configured to be coupled with handle 101, another shaft 405 or accessory attachment 601. In some embodiments, the at least one tapered portion is attached to a remainder of the tube 438 by a swaging method to eliminate rivets, fasteners, or rough portions within tube 438 to prevent clogging of tube 438.

A first shaft coupling 437 comprising the shaft fluid input 425, the first shaft electrical contact 429 and the first shaft air passage 433 is configured to mate with the second end 111 (FIG. 1) of the handle 101 (FIG. 1) to connect the shaft fluid input 425 with the handle fluid output 115 (FIG. 1), connect the first shaft electrical contact 429 with the second handle electrical contact 119 (FIG. 1), and connect the first shaft air passage 433 with the second handle air passage 123 (FIG. 1). In an assembled state, at least a portion of the tube 438 extends further away from a center of shaft 405 than at least one of the shaft fluid input 425 or the first shaft electrical contact 429.

In some embodiments, the first shaft coupling 437 is configured to be press-fit into the second end 111 of handle 101 such that the shaft fluid input 425, the first shaft electrical contact 429 and the first shaft air passage 433 are inserted into corresponding receptacles included in the second end 111 of the handle 101.

A second shaft coupling 439 comprising the shaft fluid output 427, the second shaft electrical contact 431 and the second shaft air passage 435 is configured to mate with a corresponding accessory coupling of accessory attachment 107 to facilitate transfer of fluid from the handle 101 to the attached accessory attachment 107, supply electricity to the attached accessory attachment 107, and link an accessory air passage of an attached accessory attachment 107 with the first handle air passage 121. In some embodiments, the first shaft coupling 437 of another shaft 405 is configured to be press-fit into the second shaft coupling 439 such that the shaft fluid input 425 of the other shaft 405, the first shaft electrical contact 429 of the other shaft 405 and the first shaft air passage 433 of the other shaft 405 are inserted into corresponding receptacles included in the second shaft coupling 439 of shaft 405. In some embodiments, the accessory attachment 107 is configured to be press-fit into the second shaft coupling 439.

A shaft housing comprises housing portions 443a-443g (collectively referred to as (housing 443"). One or more of the first shaft air passage 433 is coupled with the second shaft air passage 435, the shaft fluid input 425 is coupled with the shaft fluid output 427, or the first shaft electrical contact 429 is coupled with the second shaft electrical contact 431 within the housing 443.

Figure 5:
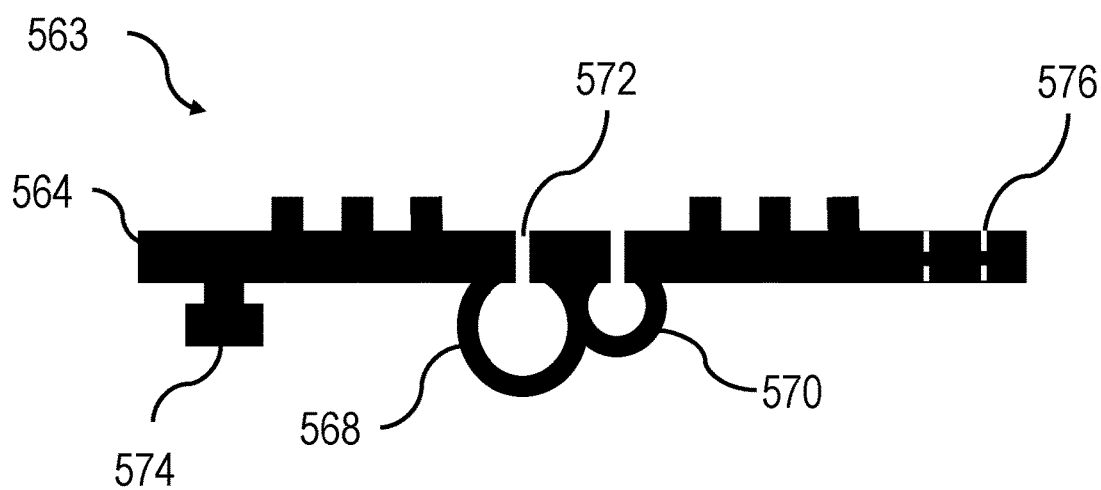
FIG. 5 is a side view of a clasp, in accordance with one or more embodiments.

FIG. 5 is a diagram of a clasp 563, in accordance with one or more embodiments. Clasp 563 is usable as clasp 163 (FIG. 1) in apparatus 100 (FIG. 1). Clasp 563 comprises a clasp body 564 that is configured to wrap around hose 147 (FIG. 1). In some embodiments, clasp body 564 comprises a molded polymer material that includes a plurality of protrusions 566 that extend away from the clasp body 564. In some embodiments, if the hose 147 is a ribbed-type flexible hose, for example, the protrusions 566 are configured to at least partially fit between adjacent ribs of the hose to hold the clasp 563 in place.

Clasp 563 comprises line seats 568 and 570. Line seats 568 and 570 are configured to accommodate the fluid supply line 149 (FIG. 1) and the power supply line 151 (FIG. 1). In some embodiments, line seat 568 and line seat 570 are equal sizes. In some embodiments, line seat 568 and line seat 570 are different sizes based on an external dimension of the fluid supply line 149 or the power supply line 151 that is to be accommodated by the corresponding line seat. A portion of the clasp body 564 is between each corresponding line seat and the exterior surface 161 (FIG. 1) of the hose 147 in a state in which the clasp 563 is wrapped around the hose 147. In some embodiments, the clasp 563 is free from having a portion of the clasp body 564 between each corresponding line seat and the exterior surface 161 of the hose 147 in a state in which the clasp 563 is wrapped around the hose 147. In some embodiments, fluid supply line 149 and power supply line 151 are sandwiched between line seat 568 or line seat 570 and the exterior surface 161 of hose 147. In some embodiments, clasp body 564 comprises a slit 572 aligned with line seat 568 or line seat 570. The slit 572 makes it possible for the clasp body 564 to be opened such that the fluid supply line 149 or the power supply like is able to be inserted into the corresponding line seat 568 or 570.

A locking tab 574 extends away from the clasp body 564 in a direction opposite to protrusions 566. Locking tab 574 is on a first end of clasp body 564. An opening 576 defined by one or more sidewalls of clasp body 564 is on a second end of clasp body 564 opposite to the first end. Locking tab 574 is configured to engage opening 576 such that the clasp body 564 is loop-shaped.

Figure 6:
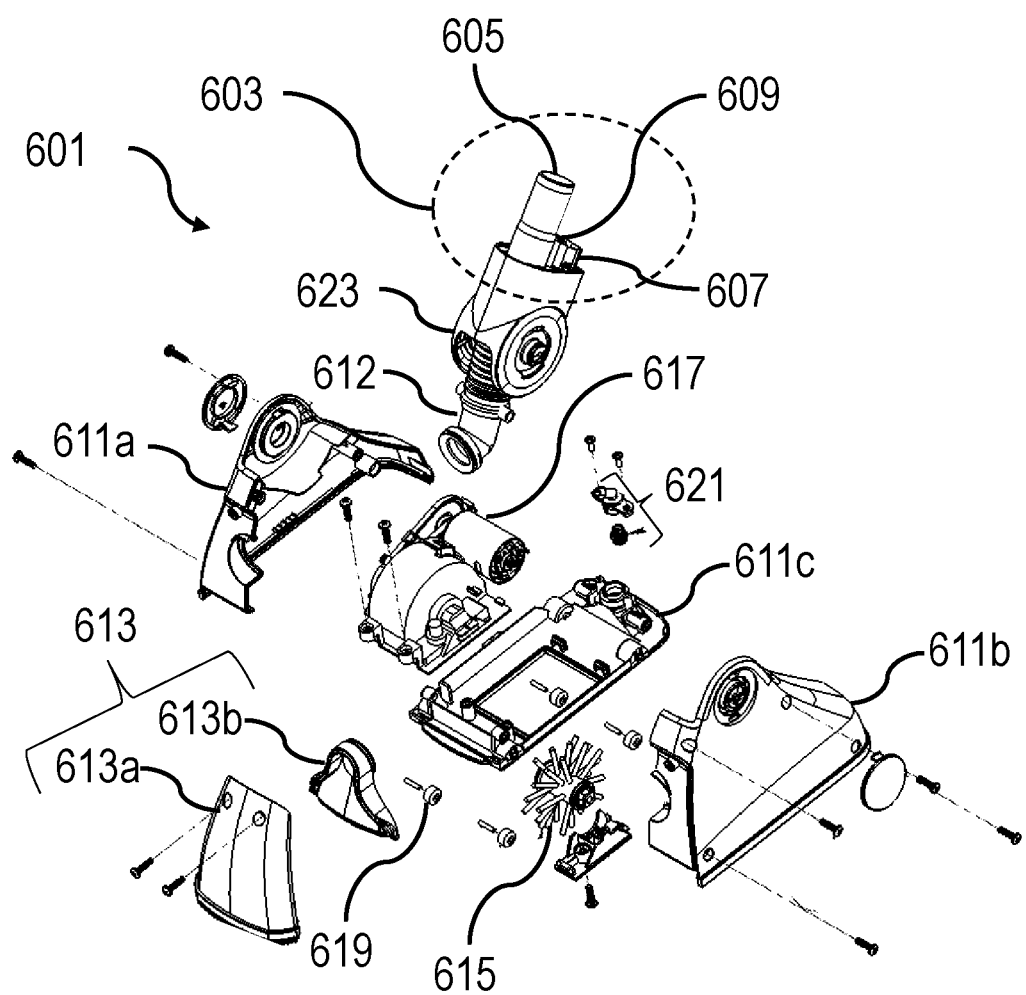
FIG. 6 is an exploded view of a cleaning head, in accordance with one or more embodiments.

FIG. 6 is an exploded view of an accessory attachment 601, in accordance with one or more embodiments. Accessory attachment 601 is a cleaning head configured to be communicatively coupled with an extraction system such as extraction system 108 (FIG. 1) by way of one or more of a handle 101 (FIG. 1), upper shaft 105*a* (FIG. 1) or lower shaft 105*b* (FIG. 1). Accessory attachment 601 is usable as accessory attachment 107*a* (FIG. 1). In some embodiments, accessory attachment 601 is a grout cleaning head.

Accessory attachment 601 comprises an accessory coupling 603 that includes an accessory air passage 605, an accessory fluid coupling 607, and an accessory electrical coupling 609. Accessory coupling 603 is configured to mate with one or more of the second shaft coupling 139 (FIG. 1) of upper shaft 105*a*, the second shaft coupling 139 of lower shaft 105*b*, or the second end 111 (FIG. 1) of the handle 101.

The accessory coupling 603 is configured to facilitate transfer of fluid from the handle 101 to accessory fluid coupling 607, supply electricity to the accessory electrical coupling 609, and link the accessory air passage 605 with the first handle air passage 121 directly or indirectly by way of at least one of the upper shaft 105*a* or the lower shaft 105*b*.

Accessory attachment 601 includes body portions 611*a*, 611*b* and 611*c* (collectively referred to as accessory body 611). A nozzle 613 comprising a front portion 613*a* and a rear portion 613*b* is configured to be on a front side of accessory body 611. Accessory air passage 605 is communicatively coupled with nozzle 613 through accessory body 611 by way of one or more of a tube, a shaft, a hose, a channel, or some other suitable structure 612. In some embodiments, accessory air passage 605 is communicatively coupled with nozzle 613 by way of one or more of a tube, a shaft, a hose, a channel, or some other suitable structure external to accessory body 611. In some embodiments, nozzle 613 comprises a flexible tip or squeegee portion that is configured to prevent fluid or debris from entering the nozzle 613 if the accessory attachment 601 is moved in a first direction, and to allow fluid or debris from entering the nozzle 613 if the accessory attachment 601 is moved in a second direction opposite to the first direction. For example, if the body 601 is moved in the first direction, the flexible tip is configured to promote the gathering or pushing of fluid and/or debris along a surface, and then if the body 601 is moved in the second direction, the flexible tip is configured to facilitate drawing of the fluid and/or debris into nozzle 613.

An agitator 615 and an agitator motor 617 are configured to be accommodated inside accessory body 611. Agitator 615 comprises one or more of a brush, a spin brush, a rotary brush, a blade, or some other suitable structure. In some embodiments, agitator 615 is capable of being removed from accessory body 611 for cleaning, replacement or service. Agitator motor 617 is communicatively coupled with the accessory electrical coupling 609. The agitator motor 617 is configured to cause the agitator 615 to move based on electricity received by way of one or more of the first handle electrical contact 117 (FIG. 1), the second shaft electrical contact 131 of the upper shaft 105*a* or the second shaft electrical contact 131 of the lower shaft 105*b*. In some embodiments, agitator motor 617 is configured to cause the agitator 615 to move in a direction toward nozzle 613. In some embodiments, agitator motor 617 is configured to cause the agitator 615 to move in a direction away from nozzle 613.

In some embodiments, agitator motor 617 comprises at least one sensor configured to detect whether the agitator 615 is not moving when the agitator 615 should be moving, indicating that the agitator 615 is jammed. If jammed, agitator motor 617 is configured to turn off to prevent damage to the agitator motor 617. In some embodiments, agitator motor 617 comprises a sensor configured to detect a rotational speed of agitator 617 and a processor configured to cause agitator motor 617 to increase or decrease the rotational speed of agitator 615. For example, if the agitator motor 617 is configured to cause the agitator 617 to rotate at a predetermined quantity of revolutions per minute (RPM), and the agitator motor 617 detects that the agitator 615 is rotating a speed that is less than the predetermined quantity of RPM's, the agitator motor 617, in some embodiments, is configured to increase the RPM's of the agitator 615 to the predetermined rotating speed.

Accessory body portion 611*c* is on a bottom side of accessory attachment 601 and includes an opening through which a portion of the agitator 615 is exposed. One or more portions of agitator 615 extend through the opening in accessory body portion 611*c*. A plurality of wheels 619 are attached to accessory body portion 611*c*. The wheels 619 are positioned on accessory body portion 611*c* such that the agitator 615 is free to move within the opening and to contact a surface opposite to the accessory body portion 611*c* with which the wheels 619 are in contact. The wheels 619 are configured to facilitate movement of the accessory attachment 601 over a surface with which the wheels 619 are in contact.

In some embodiments, wheels 619 and agitator 615 are correspondingly sized to minimize drag on the agitator 615 caused by excessive contact between the surface opposite to the accessory body portion 611*c* and agitator 615. In some embodiments, wheels 619 and agitator 615 are correspondingly sized to maximize a depth of agitator 615 into a grout line that the accessory attachment 601 is configured to clean. For example, if a conventional tile floor has tiles separated by a grout line, and the grout line has an average depth with respect to a surface of the tiles separated by the grout line, the wheels 619 are configured to support the accessory body portion 611*c* over the tiles and the grout line, and the agitator is configured to contact the grout line to achieve a deep penetration into the grout line while minimizing drag on the agitator 615 caused by excessive contact between the grout line and/or the surface of the tiles opposite to the accessory body portion 611*c*. The agitator is configured to loosen debris from the grout line and/or the surface of tiles that that separated by the grout line.

An accessory fluid output 621 is configured to be accommodated by accessory body portion 611*c* such that the accessory fluid output 621 is positioned to expel fluid received from the accessory fluid coupling 607 by way of one or more of the second shaft coupling 139 of upper shaft 105*a*, the second shaft coupling 139 of lower shaft 105*b*, or the second end 111 of the handle 101. In some embodiments, accessory fluid output 621 comprises a spray tip that is capable of being removed from accessory attachment 601 without removing any other component of accessory attachment 601. In some embodiments, the spray tip of accessory fluid output 621 is attached to accessory body portion 611*c* by way of a quarter-turn fastening system by which the spray tip of the accessory fluid output 621 is configured to interact with accessory body portion 611*c*. In some embodiments, accessory body portion 611*c* comprises a threaded portion configured to mate with the spray tip of accessory fluid output 621. In some embodiments, accessory fluid output 621 is positioned on an external surface of accessory body 611 in a position to expel fluid received from the accessory fluid coupling 607 onto a surface opposite to the accessory fluid output 621. In some embodiments, accessory fluid output 621 is configured to expel fluid onto a surface with which wheels 619 are in contact. In some embodiments, the accessory fluid output 621 is positioned on a side of accessory body portion 611*c* that is opposite to nozzle 613 such that agitator 615 is between accessory fluid output 621 and nozzle 613. In some embodiments, the accessory fluid output 621 is configured to spray cleaning fluid onto a surface opposite accessory body portion 611*c* such that if cleaning fluid is sprayed at a time that the accessory attachment 601 is being moved in a direction extending from the agitator 615 toward a rear portion of the accessory attachment 601, the accessory fluid output 621 expels cleaning fluid along a concentrated path that is capable of at least being partially directed into a grout line between tiles.

Accessory coupling 603 is positioned on a neck portion 623 of accessory attachment 601. In some embodiments, neck portion 623 of accessory attachment 601 is hinged such that the neck portion 623 is capable of rotating about and axis. In some embodiments, neck portion 623 comprises a flexible joint configured to allow the accessory fluid coupling to be moved with a greater degree of freedom with respect to the accessory body 611 than a rotation about an axis. In some embodiments, the flexibility of the neck portion 623 increases a user's ability to effectively operate the accessory attachment 601.

In use, the accessory attachment 601 is configured to expel fluid supplied by the extraction system 108 onto a surface opposite to accessory body portion 611*c*. Agitator 615 is configured to move with respect to the surface opposite accessory body portion 611*c*. Nozzle 613 is configured to contact or at least be opposing the surface opposite accessory body portion 611*c* such that one or more of air, fluid or debris is drawn from the surface opposite accessory body portion 611*c* into nozzle 613 based on a suction force provided by the extraction system 108. The suction force provided by the extraction system 108 causes the air, fluid and/or debris to be drawn through the nozzle 613 into at least one of the shaft air passages or the handle air passages and the hose based on the combination of the upper shaft 105*a*, lower shaft 105*b* and handle 101 with which the accessory attachment 601 is attached.

In some embodiments, the agitator motor 617 is configured to cause agitator 615 to rotate toward or away from nozzle 613 based on a direction of movement of the accessory attachment 601. In some embodiments, accessory fluid output 621 is configured to expel cleaning fluid onto a surface opposite accessory body portion 611*c* such that cleaning fluid is expelled onto the surface as the accessory attachment 601 moves in a forward direction before the accessory attachment 601 is moved in a backward direction so as to pretreat the surface prior to agitating the surface and one of more of air, fluid or debris is drawn from the surface opposite accessory body portion 611*c* into nozzle 613.

Figure 7:
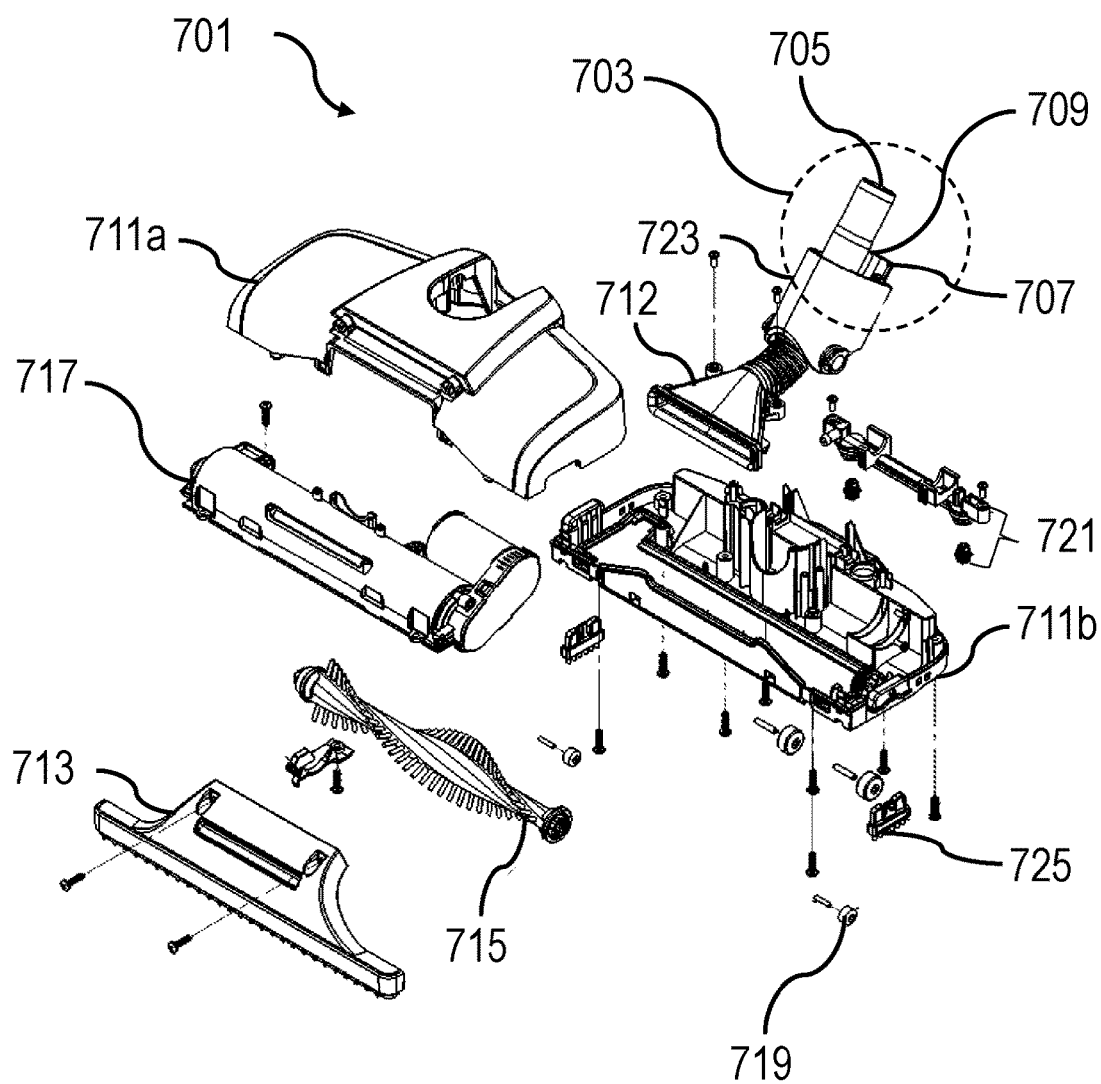
FIG. 7 is an exploded view of a cleaning head, in accordance with one or more embodiments.

FIG. 7 is an exploded view of an accessory attachment 701, in accordance with one or more embodiments. Accessory attachment 701 is a cleaning head configured to be communicatively coupled with an extraction system such as extraction system 108 (FIG. 1) by way of one or more of a handle 101 (FIG. 1), upper shaft 105*a* (FIG. 1) or lower shaft 105*b* (FIG. 1). Accessory attachment 701 is usable as accessory attachment 107*b* (FIG. 1). Accessory attachment 701 is a hard surface cleaning head.

Accessory attachment 701 comprises an accessory coupling 703 that includes an accessory air passage 705, an accessory fluid coupling 707, and an accessory electrical coupling 709. Accessory coupling 703 is configured to mate with one or more of the second shaft coupling 139 (FIG. 1) of upper shaft 105*a*, the second shaft coupling 139 of lower shaft 105*b*, or the second end 111 (FIG. 1) of the handle 101.

The accessory coupling 703 is configured to facilitate transfer of fluid from the handle 101 to accessory fluid coupling 707, supply electricity to the accessory electrical coupling 709, and link the accessory air passage 705 with the first handle air passage 121 directly or indirectly by way of at least one of the upper shaft 105*a* or the lower shaft 105*b*.

Accessory attachment 701 includes accessory body portions 711*a* and 711*b* (collectively referred to as accessory body 711). A nozzle 713 is configured to be on a front side of accessory body 711. Accessory air passage 705 is communicatively coupled with nozzle 713 through accessory body 711 by way of one or more of a tube, a shaft, a hose, a channel, or some other suitable structure 712. In some embodiments, accessory air passage 705 is communicatively coupled with nozzle 713 by way of one or more of a tube, a shaft, a hose, a channel, or some other suitable structure external to accessory body 711. In some embodiments, nozzle 713 comprises a flexible tip or squeegee portion that is configured to prevent fluid or debris from entering the nozzle 713 if the accessory attachment 701 is moved in a first direction, and to allow fluid or debris from entering the nozzle 713 if the accessory 601 is moved in a second direction opposite to the first direction. For example, if the body 701 is moved in the first direction, the flexible tip is configured to promote the gathering or pushing of fluid and/or debris along a surface, and then if the body 701 is moved in the second direction, the flexible tip is configured to facilitate drawing of the fluid and/or debris into nozzle 713.

An agitator 715 and an agitator motor 717 are configured to be accommodated inside accessory body 711. Agitator 715 comprises one or more of a brush, a spin brush, a rotary brush, a blade, or some other suitable structure. In some embodiments, agitator 715 is capable of being removed from accessory body 711 for cleaning, replacement or service. Agitator motor 717 is communicatively coupled with the accessory electrical coupling 709. The agitator motor 717 is configured to cause the agitator 715 to move based on electricity received by way of one or more of the first handle electrical contact 117 (FIG. 1), the second shaft electrical contact of the upper shaft 105a or the second shaft electrical contact of the lower shaft 105b. In some embodiments, agitator motor 717 is configured to cause the agitator 715 to move in a direction toward nozzle 713. In some embodiments, agitator motor 717 is configured to cause the agitator 715 to move in a direction away from nozzle 713.

In some embodiments, agitator motor 717 comprises at least one sensor configured to detect whether the agitator 715 is not moving when the agitator 715 should be moving, indicating that the agitator 715 is jammed. If jammed, agitator motor 717 is configured to turn off to prevent damage to the agitator motor 717. In some embodiments, agitator motor 717 comprises a sensor configured to detect a rotational speed of agitator 717 and a processor configured to cause agitator motor 717 to increase or decrease the rotational speed of agitator 715. For example, if the agitator motor 717 is configured to cause the agitator 717 to rotate at a predetermined quantity of revolutions per minute (RPM), and the agitator motor 717 detects that the agitator 715 is rotating a speed that is less than the predetermined quantity of RPM's, the agitator motor 717, in some embodiments, is configured to increase the RPM's of the agitator 715 to the predetermined rotating speed.

Accessory body portion 711b is on a bottom side of accessory attachment 701 and includes an opening through which a portion of the agitator 715 is exposed. One or more portions of agitator 715 extend through the opening in accessory body portion 711b. A plurality of wheels 719 are attached to accessory body portion 711b. The wheels 719 are positioned on accessory body portion 711b such that the agitator 715 is free to move within the opening and to contact a surface opposite to the accessory body portion 711b with which the wheels 719 are in contact. The wheels 719 are configured to facilitate movement of the accessory attachment 701 over a surface with which the wheels 719 are in contact.

An accessory fluid output 721 is configured to be accommodated by accessory body portion 711b such that the accessory fluid output 721 is positioned to expel fluid received from the accessory fluid coupling 707 by way of one or more of the second shaft coupling 139 of upper shaft 105a, the second shaft coupling 139 of lower shaft 105b, or the second end 111 of the handle 101. In some embodiments, accessory fluid output 721 comprises a spray tip that is capable of being removed from accessory attachment 701 without removing any other component of accessory attachment 701. In some embodiments, the spray tip of accessory fluid output 721 is attached to accessory body portion 711b by way of a quarter-turn fastening system by which the spray tip of the accessory fluid output 721 is configured to interact with accessory body portion 711b. In some embodiments, accessory body portion 711b comprises a threaded portion configured to mate with the spray tip of accessory fluid output 721. In some embodiments, accessory fluid output 721 is positioned on an external surface of accessory body 711 in a position to expel fluid received from the accessory fluid coupling 707 onto a surface opposite to the accessory fluid output 721. In some embodiments, accessory fluid output 721 is configured to expel fluid onto a surface with which wheels 719 are in contact. In some embodiments, the accessory fluid output 721 is positioned on a side of accessory body portion 711b that is opposite to nozzle 713 such that agitator 715 is between accessory fluid output 721 and nozzle 713. In some embodiments, the accessory fluid output 721 is configured to spray cleaning fluid onto a surface opposite accessory body portion 711b such that if cleaning fluid is sprayed at a time that the accessory attachment 701 is being moved in a direction extending from the agitator 715 toward a rear portion of the accessory attachment 701, the accessory fluid output 721 expels cleaning fluid along a path that is wider than the concentrated path by which accessory attachment 601 (FIG. 6) expels fluid, such that cleaning fluid is directed by the accessory fluid output 721 over a larger area of the surface opposite to accessory body portion 711b than a concentrated path such as that the accessory attachment 601 is configured to eject.

Accessory coupling 703 is positioned on a neck portion 723 of accessory attachment 701. In some embodiments, neck portion 723 of accessory attachment 701 is hinged such that the neck portion 723 is capable of rotating about and axis. In some embodiments, neck portion 723 comprises a flexible joint configured to allow the accessory fluid coupling to be moved with a greater degree of freedom with respect to the accessory body 711 than a rotation about an axis. In some embodiments, the flexibility of the neck portion 723 increases a user's ability to effectively operate the accessory attachment 701.

In some embodiments, one or more side brushes 725 are included. Side brushes 725 are stationary. In some embodiments, side brushes 725 are configured to be moved by agitator motor 717.

In use, the accessory attachment 701 is configured to expel fluid supplied by the extraction system 108 onto a surface opposite to accessory body portion 711b. Agitator 715 is configured to move with respect to the surface opposite accessory body portion 711b. Nozzle 713 is configured to contact or at least be opposing the surface opposite accessory body portion 711b such that one of more of air, fluid or debris is drawn from the surface opposite accessory body portion 711b into nozzle 713 based on a suction force provided by the extraction system 108. The suction force provided by the extraction system 108 causes the air, fluid and/or debris to be drawn through the nozzle 713 into at least one of the shaft air passages or the handle air passages and the hose based on the combination of the upper shaft 105a, lower shaft 105b and handle 101 with which the accessory attachment 701 is attached.

In some embodiments, the agitator motor 717 is configured to cause agitator 715 to rotate toward or away from nozzle 713 based on a direction of movement of the accessory attachment 701. In some embodiments, accessory fluid output 721 is configured to expel cleaning fluid onto a surface opposite accessory body portion 711b such that cleaning fluid is expelled onto the surface as the accessory attachment 701 moves in a forward direction before the accessory attachment 701 is moved in a backward direction so as to pretreat the surface prior to agitating the surface and one of more of air, fluid or debris is drawn from the surface opposite accessory body portion 711b into nozzle 713.

Figure 8:
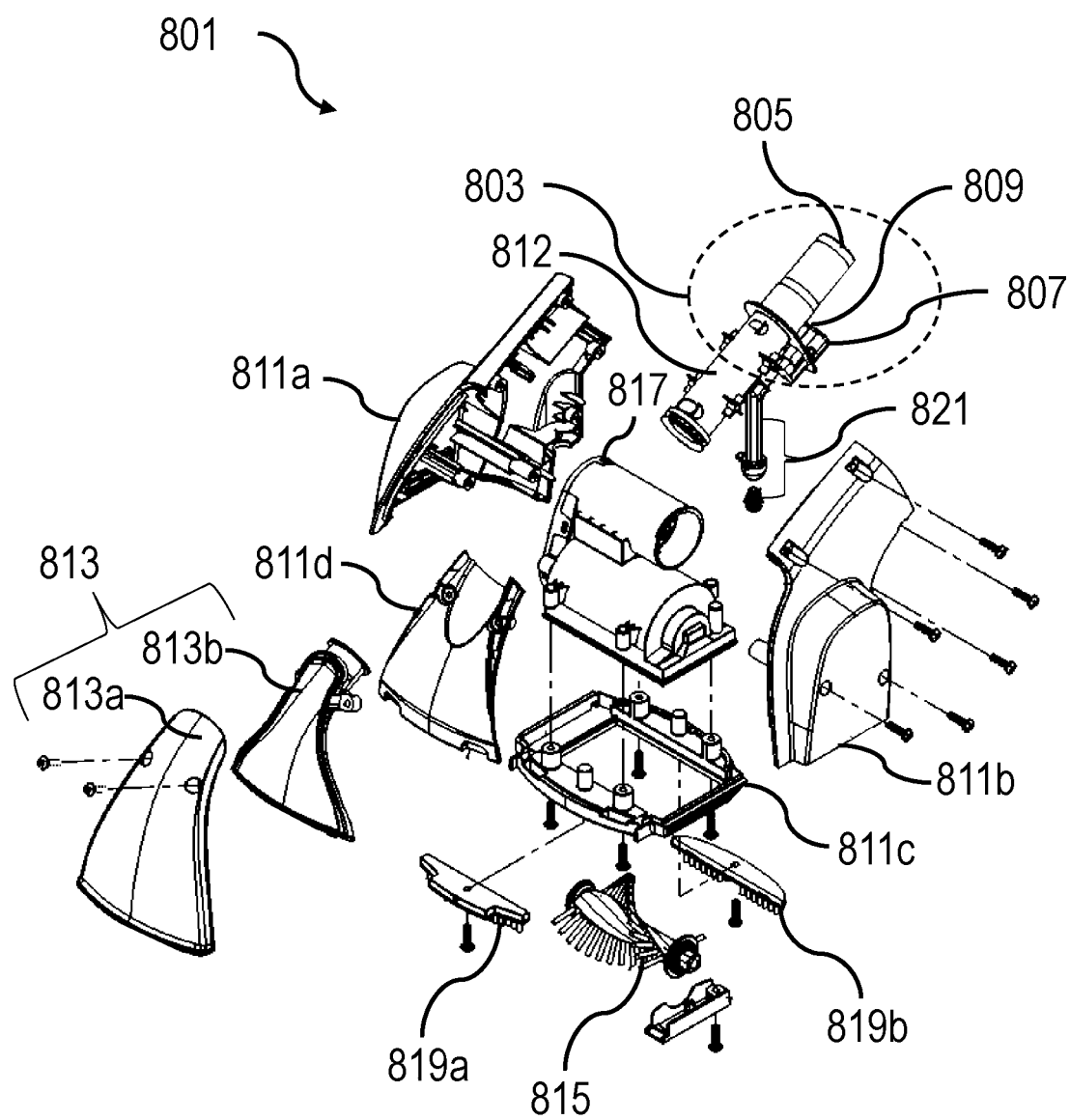
FIG. 8 is an exploded view of a cleaning head, in accordance with one or more embodiments.

FIG. 8 is an exploded view of an accessory attachment 801, in accordance with one or more embodiments. Accessory attachment 801 is a cleaning head configured to be communicatively coupled with an extraction system such as extraction system 108 (FIG. 1) by way of one or more of a handle 101 (FIG. 1), upper shaft 105a (FIG. 1) or lower shaft 105b (FIG. 1). Accessory attachment 801 is usable as accessory attachment 107c (FIG. 1). Accessory attachment 801 is an upholstery cleaning head.

Accessory attachment 801 comprises an accessory coupling 803 that includes an accessory air passage 805, an accessory fluid coupling 807, and an accessory electrical coupling 809. Accessory coupling 803 is configured to mate with one or more of the second shaft coupling 139 (FIG. 1) of upper shaft 105a, the second shaft coupling 139 of lower shaft 105b, or the second end 111 of the handle 101.

The accessory coupling 803 is configured to facilitate transfer of fluid from the handle 101 to accessory fluid coupling 807, supply electricity to the accessory electrical coupling 809, and link the accessory air passage 805 with the first handle air passage 121 directly or indirectly by way of at least one of the upper shaft 105a or the lower shaft 105b.

Accessory attachment 801 includes accessory body portions 811a, 811b, 811c and 811d (collectively referred to as accessory body 811). A nozzle 813 comprising a front portion 813a and a rear portion 813b is configured to be on a front side of accessory body 811. Accessory air passage 805 is communicatively coupled with nozzle 813 through accessory body 811 by way of one or more of a tube, a shaft, a hose, a channel, or some other suitable structure 812. In some embodiments, accessory air passage 805 is communicatively coupled with nozzle 813 by way of one or more of a tube, a shaft, a hose, a channel, or some other suitable structure external to accessory body 811.

An agitator 815 and an agitator motor 817 are configured to be accommodated inside accessory body 811. Agitator 815 comprises one or more of a brush, a spin brush, a rotary brush, a blade, or some other suitable structure. In some embodiments, agitator 815 is capable of being removed from accessory body 811 for cleaning, replacement or service. Agitator motor 817 is communicatively coupled with the accessory electrical coupling 809. The agitator motor 817 is configured to cause the agitator 815 to move based on electricity received by way of one or more of the first handle electrical contact 117 (FIG. 1), the second shaft electrical contact of the upper shaft 105a or the second shaft electrical contact of the lower shaft 105b. In some embodiments, agitator motor 817 is configured to cause the agitator 815 to move in a direction toward nozzle 813. In some embodiments, agitator motor 817 is configured to cause the agitator 815 to move in a direction away from nozzle 813.

In some embodiments, agitator motor 817 comprises at least one sensor configured to detect whether the agitator 815 is not moving when the agitator 815 should be moving, indicating that the agitator 815 is jammed. If jammed, agitator motor 817 is configured to turn off to prevent damage to the agitator motor 817. In some embodiments, agitator motor 817 comprises a sensor configured to detect a rotational speed of agitator 817 and a processor configured to cause agitator motor 817 to increase or decrease the rotational speed of agitator 815. For example, if the agitator motor 817 is configured to cause the agitator 817 to rotate at a predetermined quantity of revolutions per minute (RPM), and the agitator motor 817 detects that the agitator 815 is rotating a speed that is less than the predetermined quantity of RPM's, the agitator motor 817, in some embodiments, is configured to increase the RPM's of the agitator 815 to the predetermined rotating speed.

Accessory body portion 811c is on a bottom side of accessory attachment 801 and includes an opening through which a portion of the agitator 815 is exposed. One or more portions of agitator 815 extend through the opening in accessory body portion 811c. In some embodiments, a front stationary brush 819a is positioned on the accessory body portion 811c between agitator 815 and nozzle 813. In some embodiments, a rear stationary brush 819b is positioned on the accessory body portion 811c between agitator 815 and a rear surface of the accessory attachment 801.

An accessory fluid output 821 is configured to be accommodated by accessory body portion 811c such that the accessory fluid output 821 is positioned to expel fluid received from the accessory fluid coupling 807 by way of one or more of the second shaft coupling 139 of upper shaft 105a, the second shaft coupling 139 of lower shaft 105b, or the second end 111 of the handle 101. In some embodiments, accessory fluid output 821 is positioned on an external surface of accessory body 811 in a position to expel fluid received from the accessory fluid coupling 807 onto a surface opposite to the accessory fluid output 821. In some embodiments, accessory fluid output 821 comprises a spray tip that is capable of being removed from accessory attachment 801 without removing any other component of accessory attachment 801. In some embodiments, the spray tip of accessory fluid output 821 is attached to accessory body portion 811c by way of a quarter-turn fastening system by which the spray tip of the accessory fluid output 821 is configured to interact with accessory body portion 811c. In some embodiments, accessory body portion 811c comprises a threaded portion configured to mate with the spray tip of accessory fluid output 821.

In use, the accessory attachment 801 is configured to expel fluid supplied by the extraction system 108 onto a surface opposite to accessory body portion 811c. Agitator 815 is configured to move with respect to the surface opposite accessory body portion 811c. Nozzle 813 is configured to contact or at least be opposing the surface opposite accessory body portion 811c such that one of more of air, fluid or debris is drawn from the surface opposite accessory body portion 811c into nozzle 813 based on a suction force provided by the extraction system 108. The suction force provided by the extraction system 108 causes the air, fluid and/or debris to be drawn through the nozzle 813 into at least one of the shaft air passages or the handle air passages and the hose based on the combination of the upper shaft 105a, lower shaft 105b and handle 101 with which the accessory attachment 801 is attached.

An aspect of this description is related to an apparatus, comprising a handle and a shaft. The handle comprises a first end and a second end opposite the first end, a handle fluid input on the first end of the handle, a handle fluid output on the second end of the handle communicatively coupled with the handle fluid input, a first handle electrical contact on the first end of the handle, a second handle electrical contact on the second end of the handle communicatively coupled with the first handle electrical contact, a first handle air passage on the first end of the handle, and a second handle air passage on the second end of the handle. The shaft comprises a shaft fluid input, a shaft fluid output communicatively coupled with the shaft fluid input, a first shaft electrical contact, a second shaft electrical contact communicatively coupled with the first shaft electrical contact, a first shaft air passage, a second shaft air passage communicatively coupled with the first shaft air passage, and a first shaft coupling comprising the shaft fluid input, the first shaft electrical contact and the first shaft air passage. The first shaft coupling is configured to mate with the second end of the handle to connect the shaft fluid input with the handle fluid output, connect the first shaft electrical contact with the second handle electrical contact, and connect the first shaft air passage with the second handle air passage.

Another aspect of this description is related to an apparatus, comprising a handle, a pair of shafts and a connectivity bundle. The handle comprises a first end and a second end opposite the first end, a handle fluid input on the first end of the handle, a handle fluid output on the second end of the handle communicatively coupled with the handle fluid input, a first handle electrical contact on the first end of the handle, a second handle electrical contact on the second end of the handle communicatively coupled with the first handle electrical contact, a first handle air passage on the first end of the handle, and a second handle air passage on the second end of the handle. Each shaft of the pair of shafts comprises a shaft fluid input, a shaft fluid output communicatively coupled with the shaft fluid input, a first shaft electrical contact, a second shaft electrical contact communicatively coupled with the first shaft electrical contact, a first shaft air passage, a second shaft air passage communicatively coupled with the first shaft air passage, and a first shaft coupling comprising the shaft fluid input, the first shaft electrical contact and the first shaft air passage. The first shaft coupling is configured to mate with the second end of the handle to connect the shaft fluid input with the handle fluid output, connect the first shaft electrical contact with the second handle electrical contact, and connect the first shaft air passage with the second handle air passage. The connectivity bundle comprises a hose communicatively coupled with the first handle air passage, a fluid supply line communicatively coupled with the handle fluid input, a power supply line communicatively coupled with the first handle electrical contact, and an extraction system coupler comprising a suction port coupling communicatively coupled with the hose, a fluid supply coupling communicatively coupled with the fluid supply line, and a power supply contact communicatively coupled with the power supply line. The extraction system coupler is configured to facilitate suction of one or more of air or fluid through the hose and into an extraction system with which the extraction system coupler is connected, and to facilitate a transfer of electricity from the connected extraction system to the power supply line.

A further aspect of this description is related to an apparatus, comprising a handle, a shaft, a connectivity bundle, and an accessory. The handle comprises a first end and a second end opposite the first end, a handle fluid input on the first end of the handle, a handle fluid output on the second end of the handle communicatively coupled with the handle fluid input, a first handle electrical contact on the first end of the handle, a second handle electrical contact on the second end of the handle communicatively coupled with the first handle electrical contact, a first handle air passage on the first end of the handle, and a second handle air passage on the second end of the handle. The shaft comprises a shaft fluid input, a shaft fluid output communicatively coupled with the shaft fluid input, a first shaft electrical contact, a second shaft electrical contact communicatively coupled with the first shaft electrical contact, a first shaft air passage, a second shaft air passage communicatively coupled with the first shaft air passage, a first shaft coupling comprising the shaft fluid input, the first shaft electrical contact and the first shaft air passage, and a second shaft coupling comprising the shaft fluid output, the second shaft electrical contact and the second shaft air passage. The first shaft coupling is configured to mate with the second end of the handle to connect the shaft fluid input with the handle fluid output, connect the first shaft electrical contact with the second handle electrical contact, and connect the first shaft air passage with the second handle air passage. The connectivity bundle, comprises a hose communicatively coupled with the first handle air passage, a fluid supply line communicatively coupled with the handle fluid input, a power supply line communicatively coupled with the first handle electrical contact, and an extraction system coupler comprising a suction port coupling communicatively coupled with the hose, a fluid supply coupling communicatively coupled with the fluid supply line, and a power supply contact communicatively coupled with the power supply line. The extraction system coupler is configured to facilitate suction of one or more of air or fluid through the hose and into an extraction system with which the extraction system coupler is connected, and to facilitate a transfer of electricity from the connected extraction system to the power supply line. The accessory is one accessory of a plurality of accessories removably attached to the second shaft coupling. Each accessory of the plurality of accessories comprises a corresponding accessory air passage and an accessory coupling configured to mate with the second shaft coupling to facilitate transfer of fluid from the handle to the at least one removably attached accessory of the plurality of accessories, supply electricity to the at least one removably attached accessory of the plurality of accessories, and link the accessory air passage of at least one removably attached accessory of the plurality of accessories with the first handle air passage.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure. As such, although features of several embodiments are expressed in certain combinations among the foregoing description and claims, the features or steps discussed with respect to some embodiments can be arranged in any combination or order.

What is claimed is:
1. An apparatus, comprising:
  a handle, comprising:
    a first end and a second end opposite the first end;
    a grip portion between the first end of the handle and the second end of the handle; and
    a grip guard, separated from the grip portion, and connecting the first end of the handle with the second end of the handle,
    wherein
      the first end of the handle includes a handle fluid input, a first handle electrical contact, and a first handle air passage,
      the second end of the handle includes a handle fluid output communicatively coupled with the handle fluid input, a second handle electrical contact communicatively coupled with the first handle electrical contact, and a second handle air passage communicatively coupled with the first handle air passage, the second handle air passage is communicatively coupled with the first handle air passage through the grip portion, the handle fluid output is communicatively coupled with the handle fluid input by way of the grip guard, and the first handle electrical contact is communicatively coupled with the second handle electrical contact by way of the grip guard; and a shaft comprising a shaft fluid input, a shaft fluid output communicatively coupled with the shaft fluid input, a first shaft electrical contact, a second shaft electrical contact communicatively coupled with the first shaft electrical contact, a first shaft air passage, a second shaft air passage communicatively coupled with the first shaft air passage, and a first shaft coupling comprising the shaft fluid input, the first shaft electrical contact and the first shaft air passage, wherein the first shaft coupling is configured to mate with the second end of the handle to connect the shaft fluid input with the handle fluid output, connect the first shaft electrical contact with the second handle electrical contact, and connect the first shaft air passage with the second handle air passage.

2. The apparatus of claim 1, wherein the shaft further comprises:

a second shaft coupling comprising the shaft fluid output, the second shaft electrical contact and the second shaft air passage, the second shaft coupling being configured to mate with a corresponding accessory coupling to facilitate transfer of fluid from the handle to an attached accessory, supply electricity to the attached accessory, and link an accessory air passage with the first handle air passage.

3. The apparatus of claim 2, where the shaft is a first shaft, and the accessory is a second shaft identical to the first shaft.

4. The apparatus of claim 2, wherein the handle comprises a trigger, and the accessory is a cleaning head configured to release fluid based on an actuation of the trigger.

5. The apparatus of claim 4, wherein the handle further comprises a valve coupled with the trigger, the valve is configured to be in an open position or a closed position, the trigger is configured to cause the valve to the in the open position or the closed position, and the accessory is configured to release the fluid if the valve is in the open position.

6. The apparatus of claim 4, wherein the cleaning head comprises an agitator and an agitator motor configured to cause the agitator to move based on electricity received by way of the first handle electrical contact.

7. The apparatus of claim 1, further comprising a connectivity bundle, the connectivity bundle, comprising:

a hose communicatively coupled with the first handle air passage;

a fluid supply line communicatively coupled with the handle fluid input;

a power supply line communicatively coupled with the first handle electrical contact; and an extraction system coupler comprising a suction port coupling communicatively coupled with the hose, a fluid supply coupling communicatively coupled with the fluid supply line, and a power supply contact communicatively coupled with the power supply line, wherein the extraction system coupler is configured to facilitate suction of one or more of air or fluid through the hose and into an extraction system with which the extraction system coupler is connected, and to facilitate a transfer of electricity from the connected extraction system to the power supply line.

8. The apparatus of claim 7, wherein the fluid supply line and the power supply line are fastened to an exterior surface of the hose.

9. The apparatus of claim 8, wherein the fluid supply line and the power supply line are fastened to the exterior surface of the hose by a plurality of clasps, each clasp of the plurality of clasps being configured to wrap around the hose, the fluid supply line and the power supply line, and accommodate the fluid supply line and the power supply line in a corresponding line seat such that each of the fluid supply line and the power supply line is between each corresponding line seat and the exterior surface of the hose.

10. The apparatus of claim 7, wherein the connectivity bundle is removably coupled with the handle.

11. The apparatus of claim 1, wherein the grip portion has an inner diameter, and the hose has an inner diameter equal to the inner diameter of the grip portion.

12. The apparatus of claim 11, wherein the grip portion has an outer diameter, and the hose has an outer diameter equal to the outer diameter of the grip portion.

13. The apparatus of claim 1, wherein the shaft is removably coupled with the handle.

14. An apparatus, comprising:

a handle, comprising:

a first end and a second end opposite the first end;

a grip portion between the first end of the handle and the second end of the handle; and a grip guard, separated from the grip portion, and connecting the first end of the handle with the second end of the handle, wherein the first end of the handle includes a handle fluid input, a first handle electrical contact, and a first handle air passage, the second end of the handle includes a handle fluid output communicatively coupled with the handle fluid input, a second handle electrical contact communicatively coupled with the first handle electrical contact, and a second handle air passage communicatively coupled with the first handle air passage, the second handle air passage is communicatively coupled with the first handle air passage through the grip portion, the handle fluid output is communicatively coupled with the handle fluid input by way of the grip guard, and the first handle electrical contact is communicatively coupled with the second handle electrical contact by way of the grip guard;

a pair of shafts, each shaft of the pair of shafts comprising a shaft fluid input, a shaft fluid output communicatively coupled with the shaft fluid input, a first shaft electrical contact, a second shaft electrical contact communicatively coupled with the first shaft electrical contact, a first shaft air passage, a second shaft air passage communicatively coupled with the first shaft air passage, a first shaft coupling comprising the shaft fluid input, the first shaft electrical contact and the first shaft air passage, the first shaft coupling being configured to mate with the second end of the handle to connect the shaft fluid input with the handle fluid output, connect the first shaft electrical contact with the second handle electrical contact, and connect the first shaft air passage with the second handle air passage; and a connectivity bundle, the connectivity bundle, comprising:
- a hose communicatively coupled with the first handle air passage;
- a fluid supply line communicatively coupled with the handle fluid input;
- a power supply line communicatively coupled with the first handle electrical contact; and
- an extraction system coupler comprising a suction port coupling communicatively coupled with the hose, a fluid supply coupling communicatively coupled with the fluid supply line, and a power supply contact communicatively coupled with the power supply line,
- wherein the extraction system coupler is configured to facilitate suction of one or more of air or fluid through the hose and into an extraction system with which the extraction system coupler is connected, and to facilitate a transfer of electricity from the connected extraction system to the power supply line.

15. The apparatus of claim 14, wherein each shaft of the pair of shafts comprises a housing through which the at least one of the first shaft air passage is coupled with the second shaft air passage, the shaft fluid input is coupled with the shaft fluid output, or the first shaft electrical contact is coupled with the second shaft electrical contact.

16. The apparatus of claim 15, wherein the first shaft air passage is coupled with the second shaft air passage by way of one or more of a pipe or a hose external to the housing.

17. The apparatus of claim 15, wherein the handle is removably coupled with one shaft of the pair of shafts, the shafts of the pair of shafts are removably coupled with one another, and the shafts of the pair of shafts are fastened to one another.

18. An apparatus, comprising:
a handle, comprising:
- a first end and a second end opposite the first end;
- a grip portion between the first end of the handle and the second end of the handle; and
- a grip guard, separated from the grip portion, and connecting the first end of the handle with the second end of the handle,
wherein
- the first end of the handle includes a handle fluid input, a first handle electrical contact, and a first handle air passage,
- the second end of the handle includes a handle fluid output communicatively coupled with the handle fluid input, a second handle electrical contact communicatively coupled with the first handle electrical contact, and a second handle air passage communicatively coupled with the first handle air passage,
- the second handle air passage is communicatively coupled with the first handle air passage through the grip portion,
- the handle fluid output is communicatively coupled with the handle fluid input by way of the grip guard, and
- the first handle electrical contact is communicatively coupled with the second handle electrical contact by way of the grip guard;

a shaft comprising a shaft fluid input, a shaft fluid output communicatively coupled with the shaft fluid input, a first shaft electrical contact, a second shaft electrical contact communicatively coupled with the first shaft electrical contact, a first shaft air passage, a second shaft air passage communicatively coupled with the first shaft air passage, a first shaft coupling comprising the shaft fluid input, the first shaft electrical contact and the first shaft air passage, the first shaft coupling being configured to mate with the second end of the handle to connect the shaft fluid input with the handle fluid output, connect the first shaft electrical contact with the second handle electrical contact, and connect the first shaft air passage with the second handle air passage, and a second shaft coupling comprising the shaft fluid output, the second shaft electrical contact and the second shaft air passage;

a connectivity bundle, the connectivity bundle, comprising:
- a hose communicatively coupled with the first handle air passage;
- a fluid supply line communicatively coupled with the handle fluid input;
- a power supply line communicatively coupled with the first handle electrical contact; and
- an extraction system coupler comprising a suction port coupling communicatively coupled with the hose, a fluid supply coupling communicatively coupled with the fluid supply line, a power supply contact communicatively coupled with the power supply line, wherein the extraction system coupler is configured to facilitate suction of one or more of air or fluid through the hose and into an extraction system with which the extraction system coupler is connected, and to facilitate a transfer of electricity from the connected extraction system to the power supply line; and at least one accessory of a plurality of accessories removably attached to the second shaft coupling, each accessory of the plurality of accessories comprising a corresponding accessory air passage and accessory coupling configured to mate with the second shaft coupling to facilitate transfer of fluid from the handle to the at least one removably attached accessory of the plurality of accessories, supply electricity to the at least one removably attached accessory of the plurality of accessories, and link the accessory air passage of the at least one removably attached accessory of the plurality of accessories with the first handle air passage.

* * * * *